(12) United States Patent
Philip et al.

(10) Patent No.: US 12,411,944 B2
(45) Date of Patent: Sep. 9, 2025

(54) ENDPOINT THREAT INOCULATION COMPUTING SYSTEM

(71) Applicant: Bank of America Corporation, Charlotte, NC (US)

(72) Inventors: Charles Philip, Andheri (IN); Bhaarggavee P, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 326 days.

(21) Appl. No.: 18/046,987

(22) Filed: Oct. 17, 2022

(65) Prior Publication Data

US 2024/0126873 A1    Apr. 18, 2024

(51) Int. Cl.
*G06F 21/00* (2013.01)
*G06F 21/55* (2013.01)
*G06Q 10/0635* (2023.01)

(52) U.S. Cl.
CPC ...... *G06F 21/554* (2013.01); *G06F 2221/034* (2013.01); *G06Q 10/0635* (2013.01)

(58) Field of Classification Search
CPC .................................................. G06F 21/554
See application file for complete search history.

(56) References Cited

U.S. PATENT DOCUMENTS

| | | | |
|---|---|---|---|
| 7,571,483 B1 * | 8/2009 | Bascle | H04L 63/1408 726/24 |
| 9,104,886 B1 | 8/2015 | Dolbakian et al. | |
| 9,413,780 B1 | 8/2016 | Kaplan et al. | |
| 9,838,405 B1 | 12/2017 | Guo et al. | |
| 11,438,349 B2 | 9/2022 | Kostyushko et al. | |
| 2009/0064334 A1 * | 3/2009 | Holcomb | G06F 21/554 726/24 |
| 2015/0128263 A1 | 5/2015 | Raugas et al. | |
| 2016/0191550 A1 | 6/2016 | Ismael et al. | |
| 2017/0235951 A1 * | 8/2017 | Harrison | G06F 21/51 726/24 |
| 2017/0279842 A1 | 9/2017 | Jover et al. | |
| 2018/0227320 A1 | 8/2018 | Ladnai et al. | |
| 2018/0276380 A1 | 9/2018 | Ladnai et al. | |
| 2020/0329059 A1 | 10/2020 | Anderson et al. | |

* cited by examiner

*Primary Examiner* — Jeffrey C Pwu
*Assistant Examiner* — Thong P Truong
(74) *Attorney, Agent, or Firm* — Banner & Witcoff, Ltd.

(57) ABSTRACT

Various aspects of the disclosure relate to automated monitoring and remediation of computing threats at an endpoint computing device. An endpoint monitoring tool is configured to monitor for security threats on the local host computing device. An identified threat causes the endpoint monitoring tool to automatically quarantine the local device and any associated user accounts. During a pre-defined time period the endpoint monitoring tool analyzes an impact of the threat and any user activities from the time a suspect file was created. The endpoint monitoring tool attempts to automatically mitigate the security threat during the pre-defined time period. If the threat was cleared, the local computing device and the user accounts are released for normal use. If the threat was unable to be cleared within the time period, additional mitigation processes are triggered.

12 Claims, 3 Drawing Sheets

ENDPOINT THREAT INOCULATION COMPUTING SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

Multiple users active on the enterprise organization's computing network may provide an entry point for a malicious actor, such as by targeting one or more computing devices to gain unauthorized access to the enterprise computing network. When security teams identify a compromised endpoint, a first step may be to act to contain the threat. Endpoint Detection and Response (EDR) tools often quarantine the endpoint to prevent an attack from spreading and/or to avoid data loss. This technique may be effective as a containment measure but renders the endpoint useless to the user and, depending on the computing activities provided through use of the endpoint, may even shut down production processes. As such, security teams often spend considerable time manually triaging alerts to ensure a threat is real before quarantining suspect endpoints. During a remediation phase, most organization still prefer to wipe the memory associated with the compromised endpoint completely and reimage the infected device. These activities may be performed due to a lack of trust of traditional antivirus tools that have trouble thoroughly cleaning up persistent threats, thus risking reinfection. Even with the known risks that persistent threats may remain dormant on the endpoint, most security professionals say they trust the wipe-and-reimage process as no other currently available process appears to provide better results.

Additionally, the reimaging process is manual and time-consuming—and requires the device to be offline during remediation, thus causing loss of effectiveness of individuals and/or causing the loss of one or more required services provided by the enterprise organization.

EDRs may monitor endpoint events and activities to identify suspicious behaviors that may indicate the presence of a threat. For example, such threats may include attempts to alter process injection, modify registry keys, and/or disable security solutions. These first generation EDRs may be able to provide information to help security analysts respond to and investigate security incidents, but introduce delays and/or errors as they largely rely on manual processes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like). Aspects of the disclosure relate to computer hardware and software. In particular, one or more aspects of the disclosure generally relate to computer hardware and software for monitoring computing devices for endpoint events and/or activities to identify suspicious behaviors that may indicate the presence of a threat and/or to locally manage activities at the local device level to mitigate an identified threat.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automatic identification of a threat at the endpoint level and locally triggering of threat mitigation activities including quarantine, analysis, threat remediation, and reporting activities. Additionally, a threat detection module locally installed on each endpoint of an enterprise computing network may temporarily remove the host endpoint for a pre-defined duration and either re-enable the device after the duration or refer the computing device for further remediation activities without intervention from another computing device or individual.

To overcome the outlined problems as described above, the endpoint threat inoculation computing system includes a highly customized framework including a localized containment measure. A threat may be identified locally on the endpoint, where the endpoint monitoring tool may communicate the threat identification to the user of the computing device and/or other responsible individuals or computing systems (e.g., a manager, a security system, and the like). Additionally, the identified threat may cause the endpoint detection tool to automatically quarantined for threat inoculation and/or monitoring the computing device for indications of threat activities. Quarantined users cannot be authenticated within the computing network until the endpoint monitoring tool restores their permissions and/or move the user information back to an original secure location, such as restoring the user in a lightweight directory access protocol (LDAP) database. As such, a user's account information is prevented from being leveraged to facilitate malicious and/or unauthorized activities within the computing network. Additionally, the endpoint detection tool may scan user and/or host impacts to upstream or downstream applications and infrastructure to identify whether the identified threat compromised at least a portion of the enterprise computing network.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

In some cases, an endpoint management module operational on a networked computing device may store a list of computing devices on which an endpoint detection and remediation tool or sensor is installed. The EDR tool may enable an EDR console user interface to be presented via a display device, locally to the installed computing device and/or remotely on a different computing device. This user interface may allow monitoring active and/or historical alerts on the host computing device. The EDR tool may trigger an alert, locally to the device and/or to a remote EDR system, whenever a threat is monitored on the host computing device. The alerts may vary based on priority, a remediation technique used, a threat level, the particular computing device involved and the like. The EDR tool may confirm when a threat is received and may send an initial communication to one or more user devices (e.g., a device associated with an associated user account, a device associated with a responsible (e.g., a manager) user account, and the like), where the communication includes information corresponding to the identified threat that is being monitored and an indication that the associated host computing device(s) and/or account(s) will be quarantined for the a duration (e.g., about 30 minutes, about 15 minutes, about 1 hour, or the like).

Once the EDR tool identifies a threat or potential threat to the computing device, the tool quarantines the associated computing device and disable associated user's accounts in the enterprise computing network, such as by leveraging active directory functionality. The EDR tool may analyze an impact of the potential threat and initiates remediation steps, such as antivirus scanning and/or review of user account activities from a time before a suspect file was created or from the time file creation on the host to the time of quarantine. In some cases, the monitoring continues through the quarantine process. The EDR tool may automatically clear the error via one or more EDR tools and may send notifications to alert associated users that the threat has been cleared by the EDR tool. In some cases, the notifications may include information regarding whether or not other suspicious events are being monitored. When the EDR tool identifies that the threat has been successfully cleared, the EDR tool may automatically remove the host computing device from quarantine and/or enable the one or more associated user accounts. Once completed, the user may be notified and normal functionality of the computing device may be restored. If the threat cannot be automatically cleared or otherwise mitigated within the predefined duration (e.g., 30 minutes, 15 minutes, 45 minutes and the like) the EDR tool may identify whether the threat has proceeded with further steps and notifications may be communicated to one or more user devices associated with a responsible individual (e.g., a manager) and further steps may be initiated to clear the threat, including, but not limited to removing the traces of threat, reimaging the host, resetting user's password and/or the like.

Figure 1A:
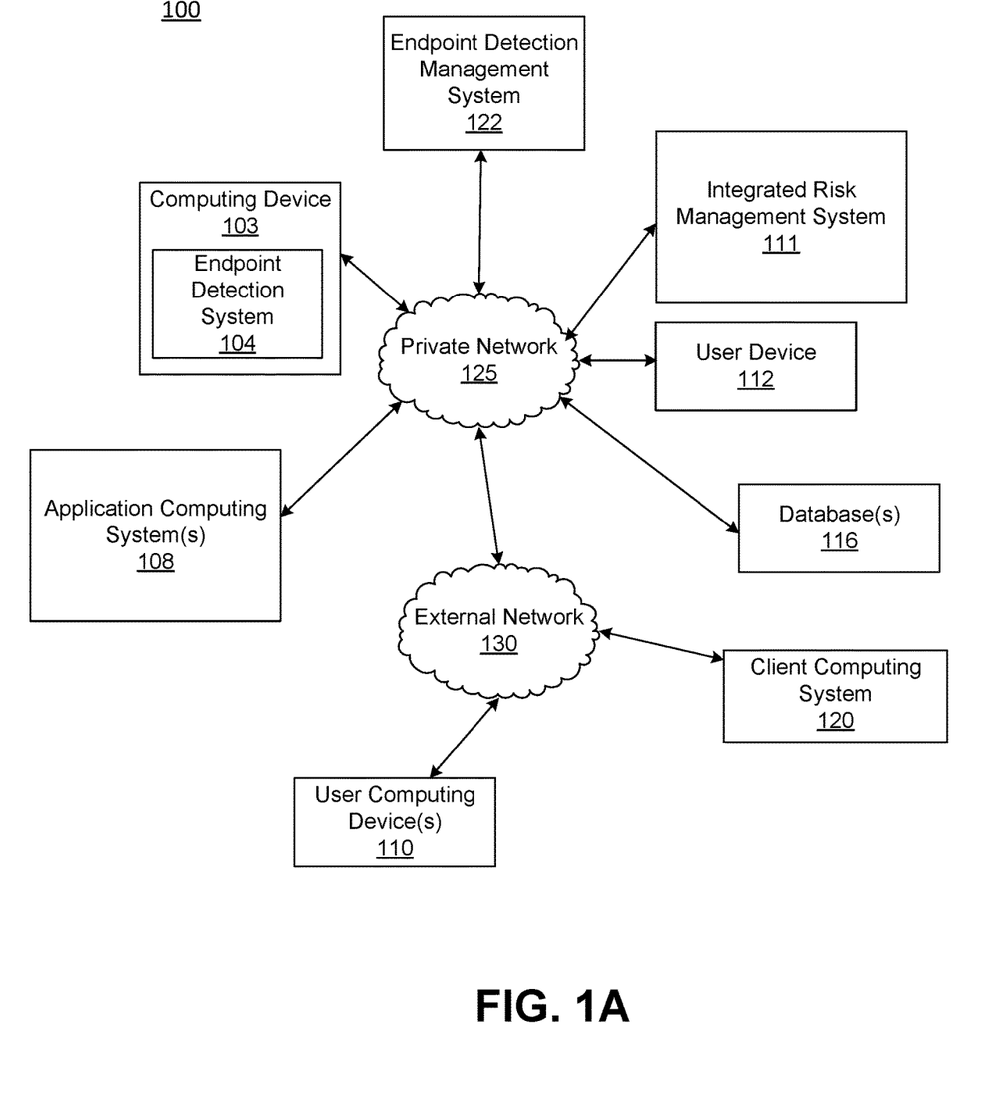
FIG. 1A shows an illustrative computing environment for local threat detection and mitigation on endpoint computing devices, in accordance with one or more aspects described herein.

FIG. 1A shows an illustrative computing environment 100 for local threat detection and mitigation on endpoint computing devices, in accordance with one or more arrangements. The computing environment 100 may comprise one or more devices (e.g., computer systems, communication devices, and the like). The computing environment 100 may comprise, for example, a computing device 103, an endpoint detection system 104, an integrated risk management system 111, one or more locally networked user devices 112, or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the endpoint detection system 104 as being incorporated within the computing device 103, the endpoint detection system 104 may be implemented on each individual computing device that is connected to the private network 125 and/or can access the private network 125 via the external network 130.

The computing device 103 may comprise one or more computing devices and/or other computer components (e.g., processors, memories, communication interfaces) configured to perform one or more functions as described herein, such as and hosting an instance of the endpoint detection system 104. Further details associated with the architecture of the endpoint detection system 104 are described with reference to FIG. 1B. Every computing device associated with the enterprise network, such as the computing device 103, the computing devices of the endpoint detection management system 122, the integrated risk management system, the user device 112, and computing devices of the application computing system(s) 108 may each include an instance of the endpoint detection system 104.

The application system 108 and/or the endpoint detection management system 122 may comprise one or more computing devices and/or other computer components (e.g., processors, memories, communication interfaces). In addition, the application system 108 may be configured to host, execute, and/or otherwise provide one or more enterprise applications. In some cases, the application systems 108 may host one or more services configured facilitate operations requested through one or more API calls, such as data retrieval and/or initiating processing of specified functionality. In some cases, the endpoint detection management system 122 may be configured to manage the location and updates of each instance of an installed endpoint detection system 104 across the enterprise network. In an arrangement where the private network 125 is associated with a financial institution (e.g., a bank), the application systems 108 may be configured, for example, to host, execute, and/or otherwise provide one or more transaction processing programs, such as an online banking application, fund transfer applications, and/or other programs associated with the financial institution. The application systems 108 may comprise various servers and/or databases that store and/or otherwise maintain account information, such as financial account information including account balances, transaction history, account owner information, and/or other information. In addition, the application systems 108 may process and/or otherwise execute transactions on specific accounts based on commands and/or other information received from other computer systems comprising the computing environment 100. In some cases, one or more of the application systems 108 may be configured, for example, to host, execute, and/or otherwise provide one or more transaction processing programs, such as electronic fund transfer applications, online loan processing applications, and/or other programs associated with the financial institution. The client computing system 122 may be configured to monitor and/or update an installed instance of the endpoint detection system 104 on one or more of the computing devices that form at least a portion of the application computing systems 108.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application systems 108, such as via the services 109. For example, the services 109 may be configured to facilitate data communications (e.g., data gathering functions, data writing functions, and the like) between the client computing system 120 and the one or more application systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125. In some cases, the client computing system 122 may be configured to monitor and/or update an installed instance of the endpoint detection system 104 on one or more of the computing devices that form at least a portion of the client computing systems and/or one or more of the user computing devices 110.

The database(s) 116 may comprise one or more computer-readable memories storing information that may be used by the endpoint detection system 104, the endpoint detection management system 122, the integrated management system 111, the application computing systems 108 and/or the like. For example, the database(s) 116 may store vulnerability information, inventory information, security information, user management information, and the like. In an arrangement, the database(s) 116 may be used for other purposes as described herein. In some cases, the client computing system 120 may write data or read data to the database(s) 116 via the services.

In one or more arrangements, the endpoint detection system 104, the endpoint detection management system 122, the application computing systems 108, client computing system 120, the user devices 110, and/or the other devices/systems in the computing environment 100 may be any type of computing device capable of receiving input via a user interface, and communicating the received input to one or more other computing devices in the computing environment 100. For example, the endpoint detection system 104, the endpoint detection management system 122, the application computing systems 108, client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the endpoint detection system 104, the endpoint detection management system 122, the application computing systems 108, client computing system 120, the user devices 110, and/or the other devices/systems in the computing environment 100 may, in some instances, be and/or comprise special-purpose computing devices configured to perform specific functions.

Figure 1B:
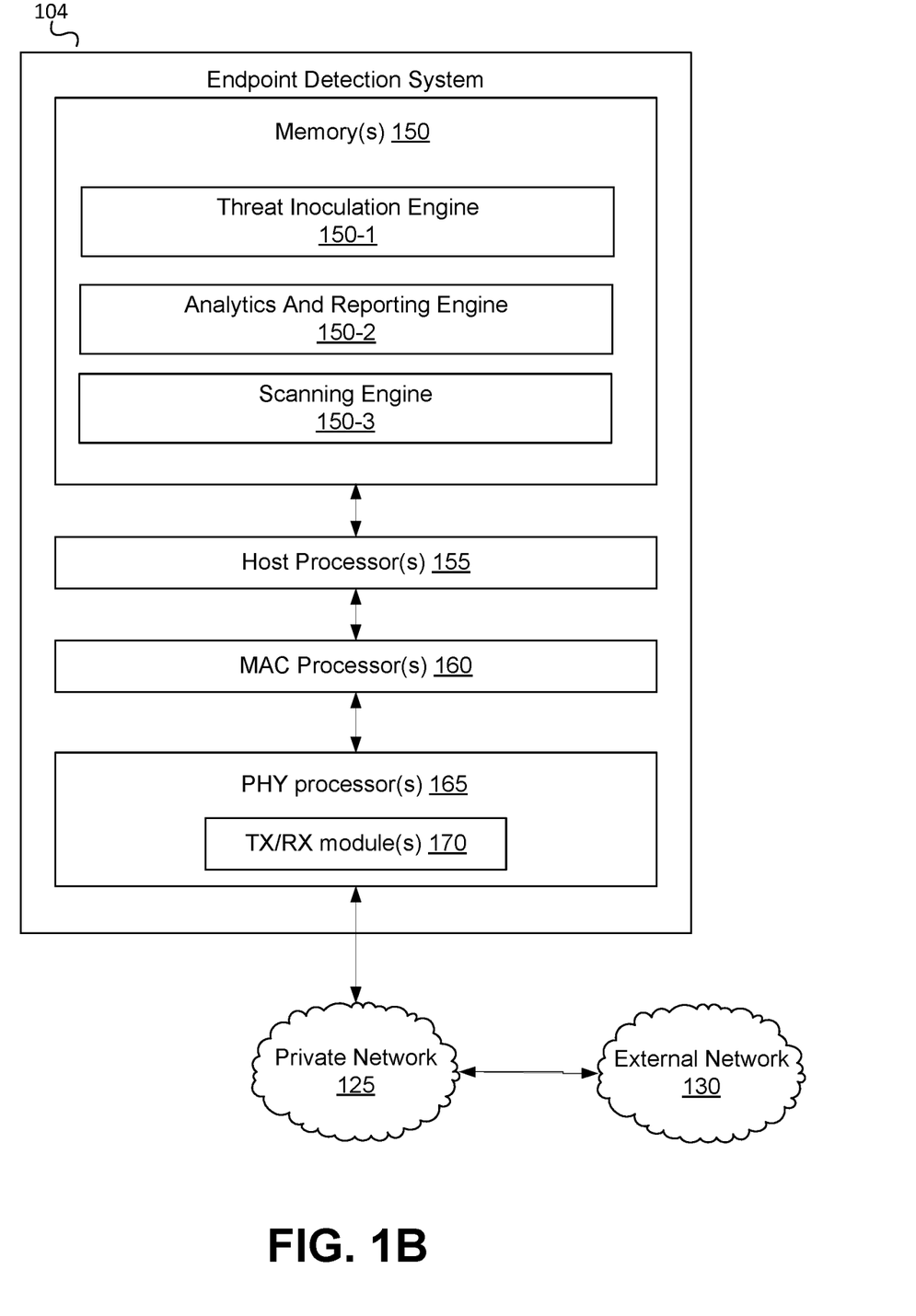
FIG. 1B shows an illustrative computing platform enabled for local threat detection and mitigation on endpoint computing devices, in accordance with one or more aspects described herein.

FIG. 1B shows an illustrative endpoint detection system 104 in accordance with one or more examples described herein. The endpoint detection system 104 may be installed on a stand-alone computing device and/or may at least be partial integrated with a computing platform or computing system, and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The endpoint detection system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the endpoint detection system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the endpoint detection system 104 may be configured to execute machine readable instructions stored in memory 150. The memory 150 may comprise (i) one or more program modules/engines having instructions that when executed by the one or more processors cause the endpoint detection system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the endpoint detection system 104 and/or by different computing devices that may form and/or otherwise make up the endpoint detection system 104. For example, the memory 150 may have, store, and/or comprise a threat inoculation engine 150-1, an analytics and reporting engine 150-2, a scanning engine 150-3 and/or the like. The threat inoculation engine 150-1 may have instructions that direct and/or cause the endpoint detection system 104 to perform one or more operations associated with monitoring operation of a computing device, identifying vulnerabilities and/or identifying potential exposure to a vulnerability, and the like. The analytics and reporting engine 150-2 may have instructions that may cause the endpoint detection system 104 to perform activities to report vulnerability exposure of the computing device 103 and/or communicate, to one or more associated computing devices, that the computing device 103 was exposed to a possible assertion of a security vulnerability and that one or more associated computing accounts have been disabled and/or the computing device 103 has been quarantined. The scanning engine 150-2 may have instructions that may cause the endpoint detection system 104 to perform scanning of the computing device 103 and/or to perform threat mitigation activities based on the scan.

While FIG. 1A illustrates the computing device 103, the endpoint detection management system, the integrated management system 111, the user device 112, and/or the application systems 108, as being separate elements connected in the private network 125, in one or more other arrangements, functions of one or more of the above may be integrated in a single device/network of devices. For example, elements in the endpoint detection system 104 (e.g., host processor(s)

155, memory(s) 150, MAC processor(s) 160, PHY processor(s) 165, TX/RX module(s) 170, and/or one or more program/modules stored in memory(s) 150) may share hardware and software elements with and corresponding to, for example, the endpoint detection management system 122, the integrated risk management system 111, and/or the application systems 108.

Figure 2:
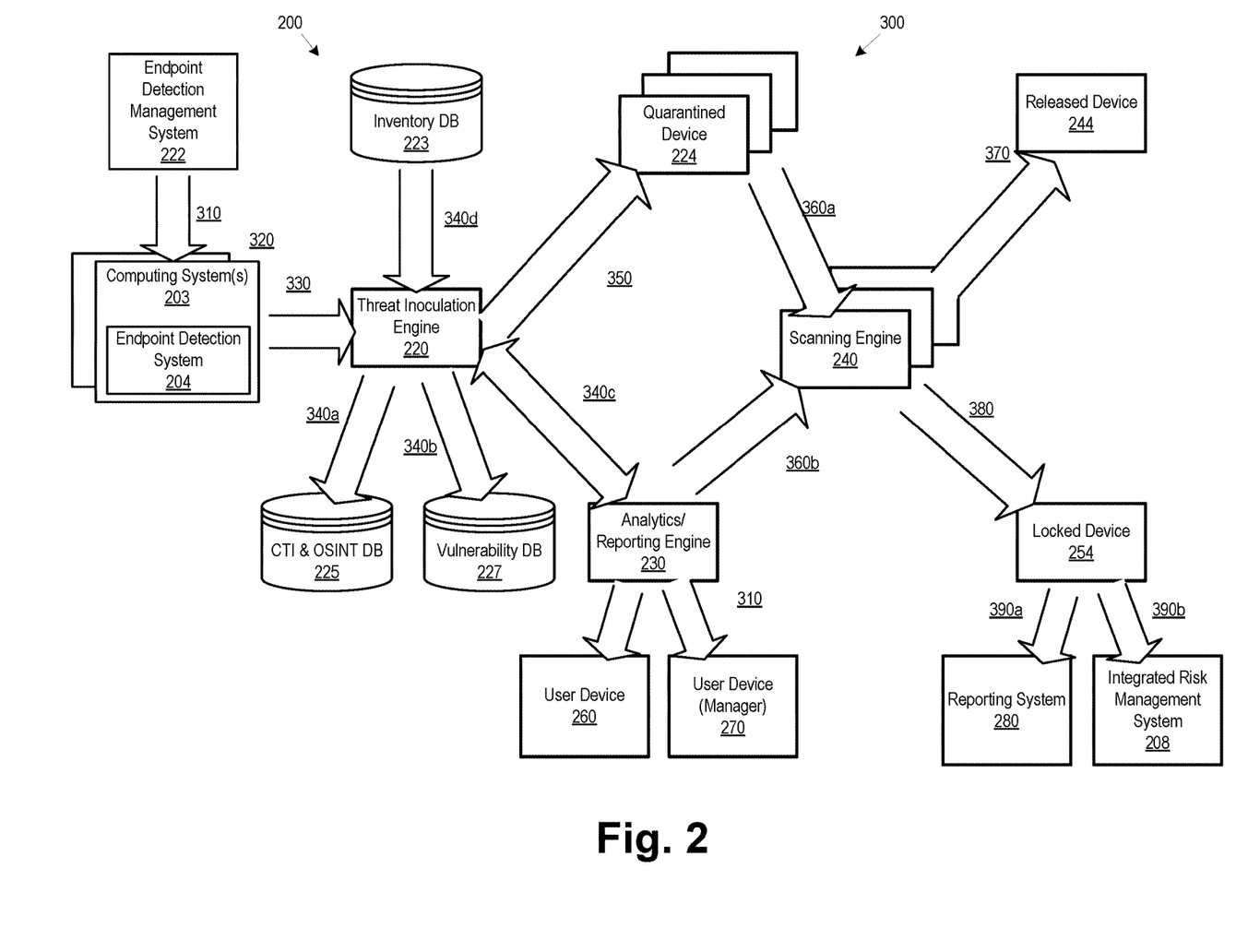
FIG. 2 shows an illustrative block diagram showing a system and method for local threat detection and mitigation on endpoint computing devices in accordance with one or more aspects described herein.

FIG. 2 shows an illustrative block diagram showing a system 200 and method 300 for local threat detection and mitigation on endpoint computing devices in accordance with one or more aspects described herein. The system 200 may comprise multiple computing devices communicatively connected to an enterprise computing system, such as the computing systems 203, which may include one or more host computing devices, server computing devices, work stations, end user computing systems, and the like. Each computing system 203 may have an instance of the endpoint detection system 204 installed, where the endpoint detection system 204 may monitor operation and/or activities performed by the computing system 203 to identify whether a vulnerability has been leveraged to expose the computing system 203 to malware and/or other malicious activities. The computing system 200 may include an endpoint detection management system 222 that may monitor operation and/or perform updates of each instance of the endpoint detections system 204 installed on the computing systems 203 of the enterprise computing network. The computing system 200 may further include a plurality of data repositories, such as the cyber threat intelligence and open source intelligence (CTI & OSINT) data store 225, a vulnerability data store 227, an inventory data store, an inventory tracking data store, a user management data store, and the like.

The endpoint detection system 204 may include one or more computing modules that perform various functionalities of the endpoint detection system 204, such as a threat inoculation engine 220, an analytics and reporting engine 230, and a scanning engine 240. In some cases, the threat inoculation engine 220 may perform monitoring functionality to identify possible instances that may correspond to a security threat to the computing system 203 on which the endpoint detection system 204 is installed. In some cases, the threat inoculation engine 220 may cause an exposed computing system 203 and/or one or more user accounts to be quarantined (e.g., the quarantined devices 224), trigger an analytics and reporting engine 230 to notify one or more users, via a communication transmitted to a user device 260, 270 such that a user associated with a quarantined device 224 may be notified that the computing system 203 had been exposed to a security threat and has been quarantined. The scanning engine 240 may perform antivirus and/or malware scanning activities, search for resolutions for identified security vulnerabilities of the computing system 203, and perform cleaning and/or mitigation activities to remove any identified antivirus and/or malware from the computing system 203. The scanning engine 240 may further install updates to software and/or firmware operational on the computing system 203 to mitigate any identified security vulnerabilities. Once completed, the scanning engine 240 may release a computing device from quarantined (e.g., the released device 244) when identified malware and/or viruses have been removed and/or security vulnerabilities have been resolved. In some cases, where the security threat could not be overcome (e.g., within a designated time period such as a 30 minute time period), the scanning device 240 may lock the associated computing system (e.g., 254) for further analysis and/or threat mitigation activities. An indication of the locked computing device may be automatically reported through a reporting system 280 and/or may be referred for further analysis via an integrated rish management system 208.

In some cases, the method 300 may be performed by a distributed threat inoculation system, where each computing system 203 may include an endpoint detection system 204. At 310, the endpoint detection management system 222 may be operational on a networked computing device (e.g., the computing system 203) and may store a list of computing devices (e.g., the computing devices 203) on which an endpoint detection and remediation tool or sensor (e.g., the endpoint detection system 204) is installed. At 320, the endpoint detection system 204 may enable an EDR console user interface to be presented via a display device, locally to the installed computing system 203 and/or remotely on a different computing device. This user interface may allow monitoring active and/or historical alerts on the host computing device. The endpoint detection system 204 may trigger an alert, locally to the device and/or to a remote EDR system, whenever a threat is monitored on the host computing device. The alerts may vary based on priority, a remediation technique used, a threat level, the particular computing device involved and the like.

For example, at 330, the threat inoculation engine 230 may analyze computing operations of the computing system 203, based on information retrieved from a plurality of data stores, such as the inventory data store 223 at 340d, the CTI & OSINT data store 225 at 340a, and the vulnerability data store 227 at 340b. At 340c, the threat inoculation engine 220 triggers the analytics and reporting engine 230 to analyze captured information to communicate the information to an associated user device 260 and/or the user device 270 of a person responsible for the quarantined user account. For example, at 340c, the endpoint detection system 204 may confirm when a threat is received and/or identified and may send an initial communication to one or more user devices (e.g., a device associated with an associated user account, a device associated with a responsible (e.g., a manager) user account, and the like), where the communication includes information corresponding to the identified threat that is being monitored and an indication that the associated host computing device(s) and/or account(s) will be quarantined for the a duration (e.g., about 30 minutes, about 15 minutes, about 1 hour, or the like).

In some cases, the system 200 may include a plurality of data repositories, such as the inventory data store 223, the CTI and OSINT data store 225, and the vulnerability data store 227. Additional data repositories may also be included in the system, such as user management and security data stores, application data stores, and the like. The inventory data store 223 may store information corresponding to a plurality of computing devices, such as a location of the computing device, a "home" location or a plurality of locations of regular use of portable computing devices, one or more user accounts associated with the computing devices and/or the like. Such information may be used to quarantine the associated computing device or other related computing devices by the endpoint detection system 204. Additionally, any associated or related user accounts may be quarantined based on the information stored I the inventory data store. The CTI and OSINT data store 225 may store information corresponding to a collection of intelligence using open-source intelligence (OSINT), social media intelligence (SCOMINT), human intelligence (HUMINT), technical intelligence, or intelligence from malicious aspects of the internet. The endpoint detection system 204 may leverage the information stored in the CTI and OSINT data store 225 to identify threats and/or utilized vulnerabilities on the associated computing device and/or may be used to mitigate the identified threat. The vulnerability data store 227 may be used to store known and/or resolved vulnerabilities associated with the computing devices of the enterprise computing system. The information may include vulnerabilities identified by application, software, firmware suppliers, such as in release notes, white papers, warning communications and the like. Additional vulnerabilities may reflect identified vulnerabilities that result from certain combinations of hardware and/or software versions. When a vulnerability has been resolved, steps to resolve the vulnerability are stored and may be utilized by the endpoint detection system 204 to resolve a vulnerability on the computing device. For example, steps to resolve a known vulnerability may include updating software and/or firmware in a certain combination of steps. The vulnerability data store 227 may be continually updated by each endpoint detection system 204 and/or other systems of the enterprise computing system.

At 350, once the endpoint detection system 204 identifies a threat or potential threat to the computing device, the tool quarantines the associated computing device and disable associated user's accounts in the enterprise computing network, such as by leveraging active directory functionality. At 360a, the scanning engine 240 of the endpoint detection system 204 may analyze an impact of the potential threat and initiate remediation steps, such as antivirus scanning and/or review of user account activities from a time before a suspect file was created or from the time file creation on the host to the time of quarantine. In some cases, the monitoring continues through the quarantine process, where analytics and/or communications may be leveraged by the scanning engine 240 at 360b. The endpoint detection system 204 may automatically clear the error via one or more EDR tools and may send notifications to alert associated users that the threat has been cleared by the endpoint detection system 204 at 370. In some cases, the notifications may include information regarding whether or not other suspicious events are being monitored. When the endpoint detection system 204 identifies that the threat has been successfully cleared, the EDR tool may automatically remove the host computing device from quarantine and/or enable the one or more associated user accounts. Once completed, the user may be notified and normal functionality of the computing device may be restored. If, at 380, the threat cannot be automatically cleared or otherwise mitigated within the predefined duration (e.g., 30 minutes, 15 minutes, 45 minutes and the like) the endpoint detection system 204 may identify whether the threat has proceeded with further steps and notifications may be communicated to one or more user devices associated with a responsible individual (e.g., a manager) at 390a and further steps may be initiated to clear the threat, including, but not limited to removing the traces of threat, reimaging the host, resetting user's password and/or the like, such as by the integrated risk management system 208, at 390b.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:
1. A computing device comprising:
 a processor; and
 non-transitory memory storing instructions that, when executed by the processor, cause the computing device to:

monitor operation of the computing device for an indication of a security threat to operation of the computing device;

quarantine, from a network connection and based on the indication of the security threat, the computing device;

automatically initiate a threat remediation process for the computing device;

associate a time duration for the threat remediation process to complete, wherein the time duration is thirty minutes;

release, based on a successful threat remediation of an identified threat, the computing device from quarantine;

communicate, to one or more user devices associated with a user account associated with the computing device and based on the successful threat remediation of the identified threat, that the identified threat has been cleared and the computing device is operational; and initiate, based on an unsuccessful threat remediation process, a threat removal process by an external computing system.

2. The computing device of claim 1, wherein the instructions further cause the computing device to quarantine a user account associated with the computing device.

3. The computing device of claim 1, wherein the instructions further cause the computing device to generate an alert that identifies the security threat to the computing device.

4. The computing device of claim 1, wherein the instructions further cause the computing device to communicate, to one or more user devices associated with a user account associated with the computing device and based on the unsuccessful threat remediation process, that further steps will be taken to remove traces of the threat.

5. A method comprising:

monitoring, by endpoint detection tool operational on a computing device, operation of the computing device for an indication of a security threat to the operation of the computing device;

quarantining, automatically by the endpoint detection tool and from a network connection and based on the indication of the security threat, the computing device;

automatically, by the endpoint detection tool, initiating a threat remediation process for the computing device;

associating a time duration for the threat remediation process to complete, wherein the time duration is thirty minutes;

releasing, by the endpoint detection tool and based on a successful threat remediation of an identified threat, the computing device from quarantine; communicating, by the endpoint detection tool and to one or more user devices associated with a user account associated with the computing device and based on the successful threat remediation of the identified threat, that the identified threat has been cleared and the computing device is operational; and initiating, automatically by the endpoint detection tool based on an unsuccessful threat remediation process, a threat removal process by an external computing system.

6. The method of claim 5, further comprising disabling a user account associated with the computing device.

7. The method of claim 5, further comprising generating an alert that identifies the security threat to the computing device.

8. The method of claim 5, further comprising communicating, by the endpoint detection tool to one or more user devices associated with a user account associated with the computing device and based on the unsuccessful threat remediation process, that further steps will be taken to remove traces of the threat.

9. Non-transitory computer readable media storing instructions that, when executed by a processor, cause a computing device to:

monitor operation of the computing device for an indication of a security threat to operation of the computing device;

quarantine, from a network connection and based on the indication of the security threat, the computing device;

automatically initiate a threat remediation process for the computing device;

associate a time duration for the threat remediation process to complete, wherein the time duration is thirty minutes;

release, based on a successful threat remediation of an identified threat, the computing device from quarantine;

communicate, to one or more user devices associated with a user account associated with the computing device and based on the successful threat remediation of the identified threat, that the identified threat has been cleared and the computing device is operational; and initiate, based on an unsuccessful threat remediation process, a threat removal process by an external computing system.

10. The non-transitory computer readable media of claim 9, wherein the instructions further cause the computing device to quarantine a user account associated with the computing device.

11. The non-transitory computer readable media of claim 9, wherein the instructions further cause the computing device to generate an alert that identifies the security threat to the computing device.

12. The non-transitory computer readable media of claim 9, wherein the instructions further cause the computing device to: communicate, to one or more user devices associated with a user account associated with the computing device and based on the unsuccessful threat remediation process, that further steps will be taken to remove traces of the threat.

* * * * *